(12) United States Patent
Sahara

(10) Patent No.: US 10,868,922 B2
(45) Date of Patent: Dec. 15, 2020

(54) IMAGE PROCESSING APPARATUS, METHOD, AND COMPUTER-READABLE MEDIUM FOR PROVIDING APPROPRIATE LOG IMAGE DATA

(71) Applicant: BROTHER KOGYO KABUSHIKI KAISHA, Nagoya (JP)

(72) Inventor: Shinya Sahara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/448,231

(22) Filed: Jun. 21, 2019

(65) Prior Publication Data
US 2019/0394343 A1  Dec. 26, 2019

(30) Foreign Application Priority Data
Jun. 22, 2018  (JP) .................. 2018-118543

(51) Int. Cl.
*H04N 1/04* (2006.01)
*H04N 1/00* (2006.01)
*H04N 1/32* (2006.01)

(52) U.S. Cl.
CPC ..... *H04N 1/00222* (2013.01); *H04N 1/00206* (2013.01); *H04N 1/00724* (2013.01); *H04N 1/32106* (2013.01)

(58) Field of Classification Search
None
See application file for complete search history.

(56) References Cited

U.S. PATENT DOCUMENTS

| | | | | |
|---|---|---|---|---|
| 8,498,003 | B2* | 7/2013 | Kirihara | H04N 1/32101 358/1.15 |
| 2007/0133037 | A1* | 6/2007 | Arai | G06K 15/00 358/1.14 |
| 2007/0133043 | A1* | 6/2007 | Maekawa | G06F 21/55 358/1.15 |
| 2007/0133054 | A1* | 6/2007 | Kobayashi | H04N 1/32122 358/1.16 |
| 2007/0135930 | A1 | 6/2007 | Kirihara et al. | |
| 2015/0085318 | A1* | 3/2015 | Takagi | G06F 3/122 358/1.15 |

(Continued)

FOREIGN PATENT DOCUMENTS

| | | |
|---|---|---|
| JP | 2000-092261 A | 3/2000 |
| JP | 2004-235680 A | 8/2004 |

(Continued)

*Primary Examiner* — Cheukfan Lee
(74) *Attorney, Agent, or Firm* — Scully, Scott, Murphy & Presser, PC

(57) ABSTRACT

An image processing apparatus includes an scanner, a print engine, and a controller configured to control the scanner to scan images of one or more document sheets, thereby generating scanned image data, generate print data based on the scanned image data, control the print engine to print, on sheets, the images based on the print data, generate first log image data through reducing a data size of image data associated with the scanned image data, determine whether the first log image data includes a particular type of page, and when determining that the first log image data includes the particular type of page, generate second log image data having higher image quality than the first log image data.

20 Claims, 8 Drawing Sheets

(56) References Cited

U.S. PATENT DOCUMENTS

2015/0146236 A1    5/2015    Enomoto

FOREIGN PATENT DOCUMENTS

| JP | 2007-166176 A | 6/2007 |
| JP | 2007-312036 A | 11/2007 |
| JP | 2008-225928 A | 9/2008 |
| JP | 2015-104071 A | 6/2015 |

* cited by examiner

IMAGE PROCESSING APPARATUS, METHOD, AND COMPUTER-READABLE MEDIUM FOR PROVIDING APPROPRIATE LOG IMAGE DATA

CROSS-REFERENCE TO RELATED APPLICATION

This application claims priority under 35 U.S.C. § 119 from Japanese Patent Application No. 2018-118543 filed on Jun. 22, 2018. The entire subject matter of the application is incorporated herein by reference.

BACKGROUND

Technical Field

Aspects of the present disclosure are related to an image processing apparatus, a method, and a non-transitory computer-readable medium for generating log image data associated with scanned image data generated by scanning document sheets.

Related Art

Heretofore, an image processing apparatus has been known that is configured to generate scanned image data representing image read from a document sheet and generate log image data from the scanned image data. More specifically, the known image processing apparatus may generate the log image data by reducing a resolution of the scanned image data and transmit the generated log image data to a log monitoring server.

SUMMARY

For instance, in an attempt to reduce a storage capacity for storing the scanned image data or shorten a period of time for transferring the scanned image data, the known image processing apparatus may generate the log image data by reducing a data size of the scanned image data. However, when the image read from the document sheet includes a small image or a long thin image, the reduction of the data size might cause a blank page. Consequently, it might lead to a problem that a user is unable to properly check an image represented by the log image data or perform an appropriate process based on the log image data.

Aspects of the present disclosure are advantageous to provide one or more improved techniques that make it possible to provide appropriate log image data.

According to aspects of the present disclosure, an image processing apparatus is provided, which includes a scanner, a print engine, and a controller. The controller is configured to control the scanner to scan images of one or more document sheets, thereby generating scanned image data, generate print data based on the scanned image data, control the print engine to print, on sheets, the images based on the print data, generate first log image data through reducing a data size of image data associated with the scanned image data, determine whether the first log image data includes a particular type of page, and when determining that the first log image data includes the particular type of page, generate second log image data having higher image quality than image quality of the first log image data.

According to aspects of the present disclosure, further provided is a method implementable on a processor coupled with an image processing apparatus including a scanner and a print engine. The method includes controlling the scanner to scan images of one or more document sheets, thereby generating scanned image data, generating print data based on the scanned image data, controlling the print engine to print, on sheets, the images based on the print data, generating first log image data through reducing a data size of image data associated with the scanned image data, determining whether the first log image data includes a particular type of page, and when determining that the first log image data includes the particular type of page, generating second log image data having higher image quality than image quality of the first log image data.

According to aspects of the present disclosure, further provided is a non-transitory computer-readable medium storing computer-readable instructions that are executable by a processor coupled with an image processing apparatus including a scanner and a print engine. The instructions are configured to, when executed by the processor, cause the image processing apparatus to control the scanner to scan images of one or more document sheets, thereby generating scanned image data, generate print data based on the scanned image data, control the print engine to print, on sheets, the images based on the print data, generate first log image data through reducing a data size of image data associated with the scanned image data, determine whether the first log image data includes a particular type of page, and when determining that the first log image data includes the particular type of page, generate second log image data having higher image quality than image quality of the first log image data.

BRIEF DESCRIPTION OF THE ACCOMPANYING DRAWINGS

Figure 4:
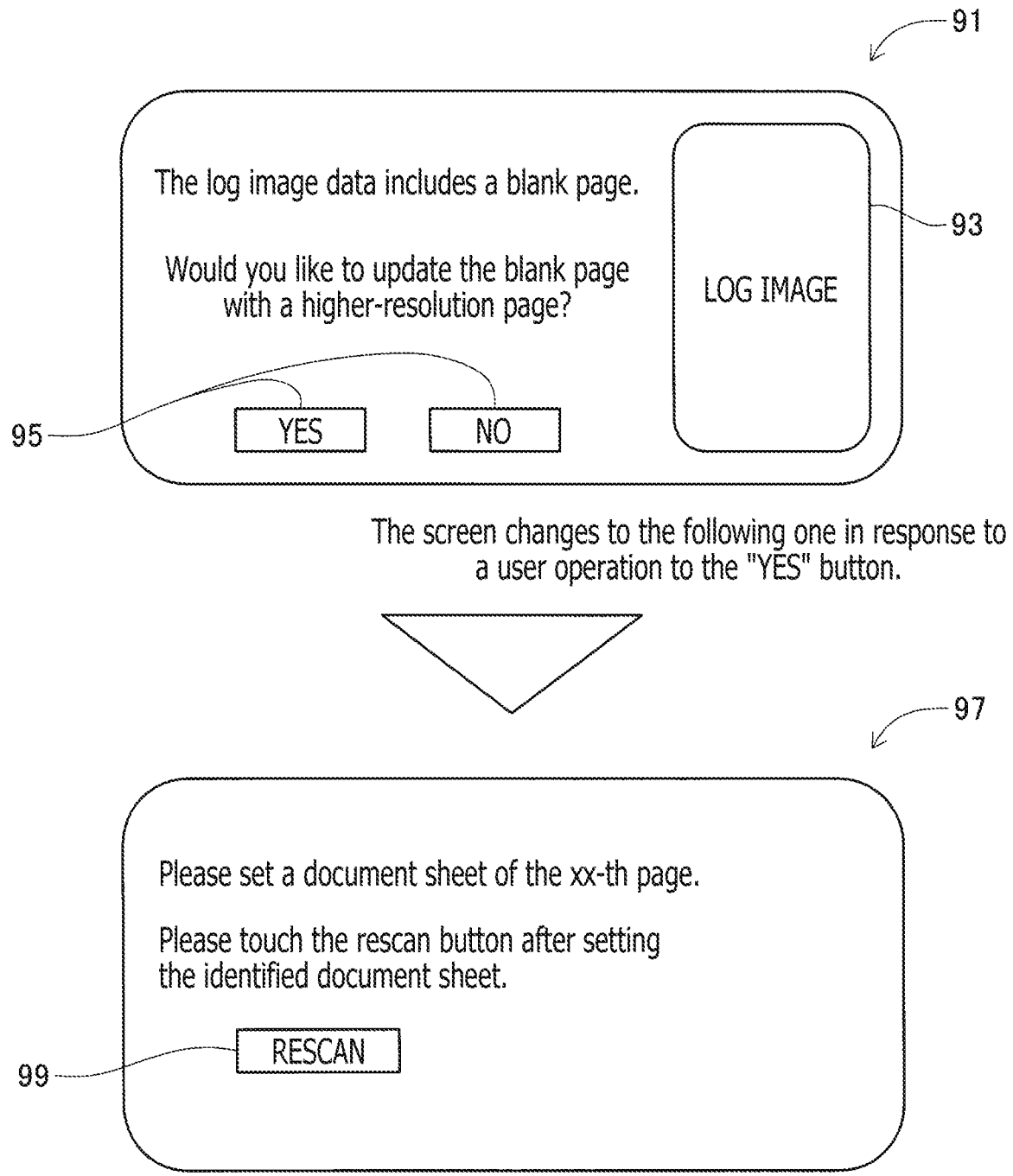

FIG. 4 exemplifies screens to be displayed on a touch panel of the MFP in the scanning process, in the first illustrative embodiment according to one or more aspects of the present disclosure.

Figure 5:
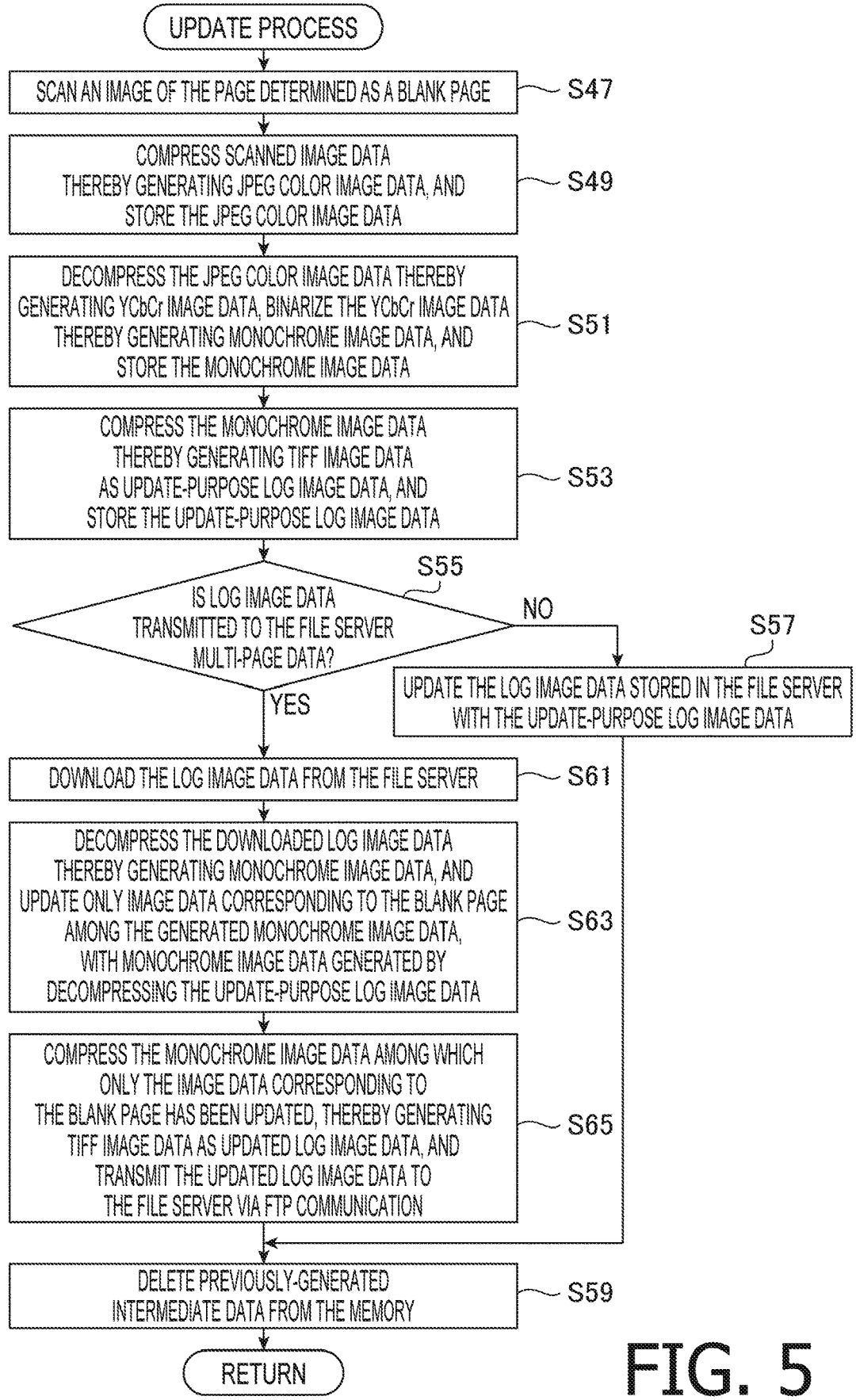

FIG. 5 is a flowchart showing a procedure of an update process to be performed by the MFP, in the first illustrative embodiment according to one or more aspects of the present disclosure.

Figure 6:
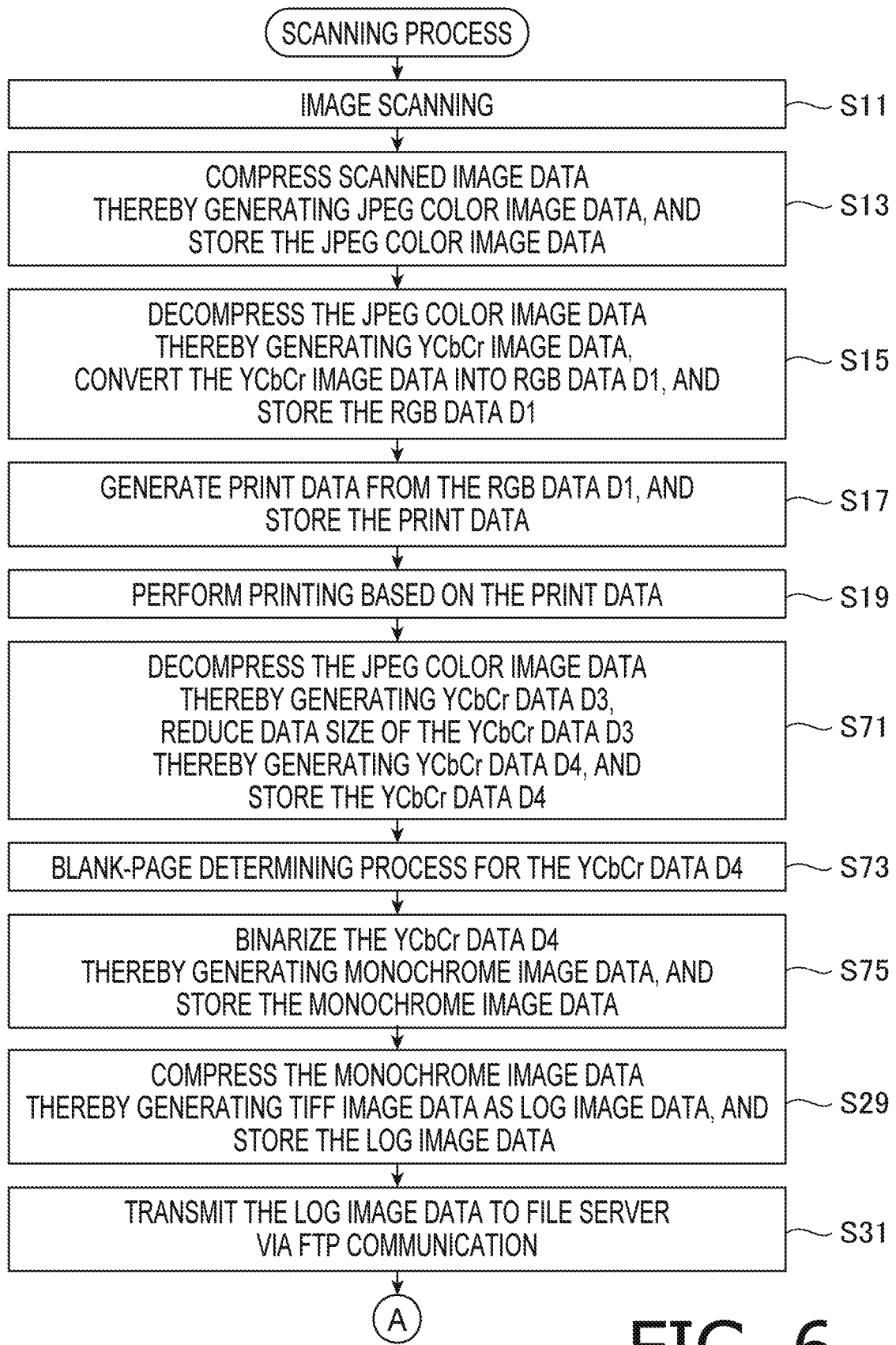
Figure 7:
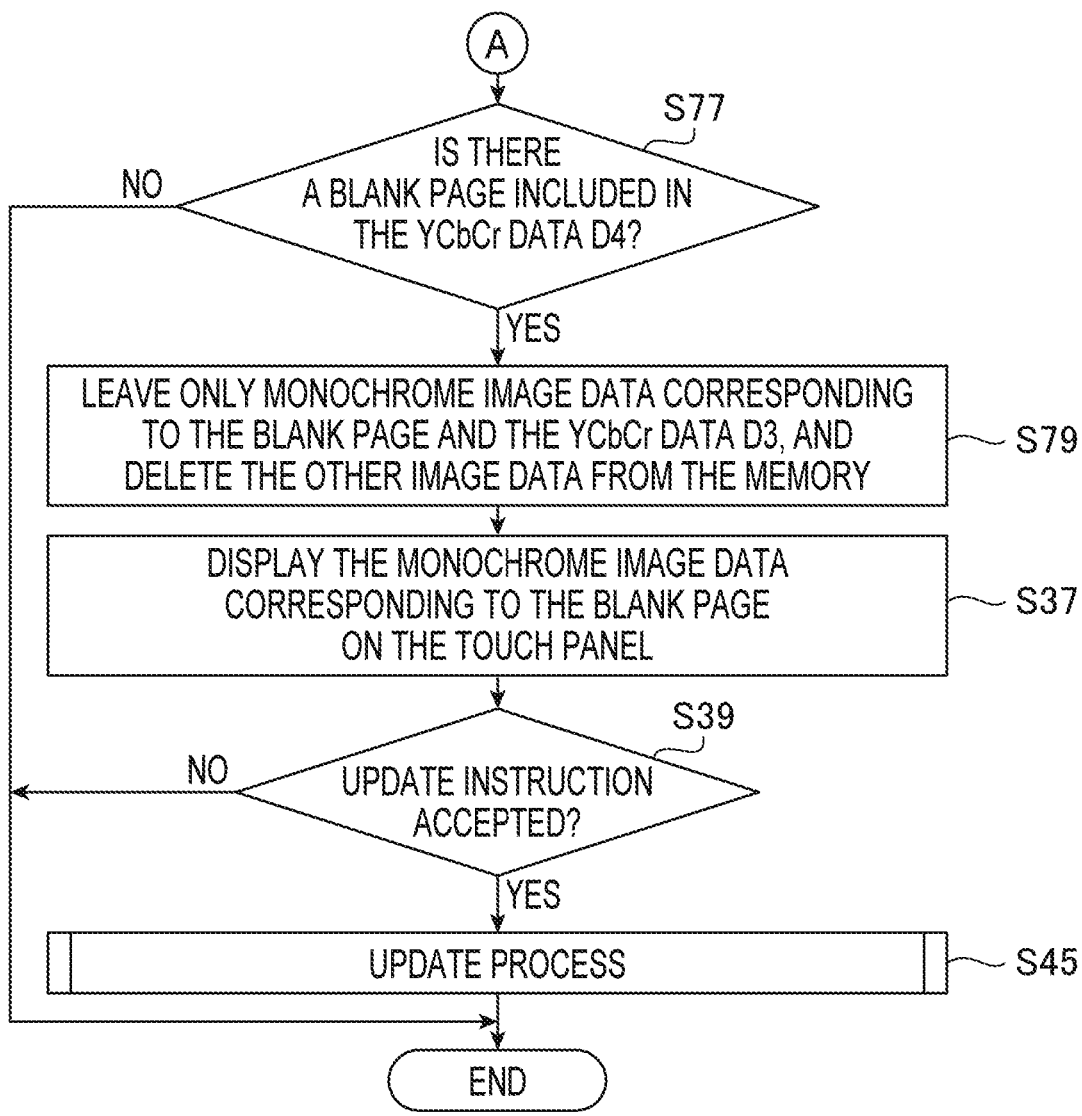

FIGS. 6 and 7 are flowcharts showing a procedure of a scanning process to be performed by the MFR in a second illustrative embodiment according to one or more aspects of the present disclosure.

Figure 8:
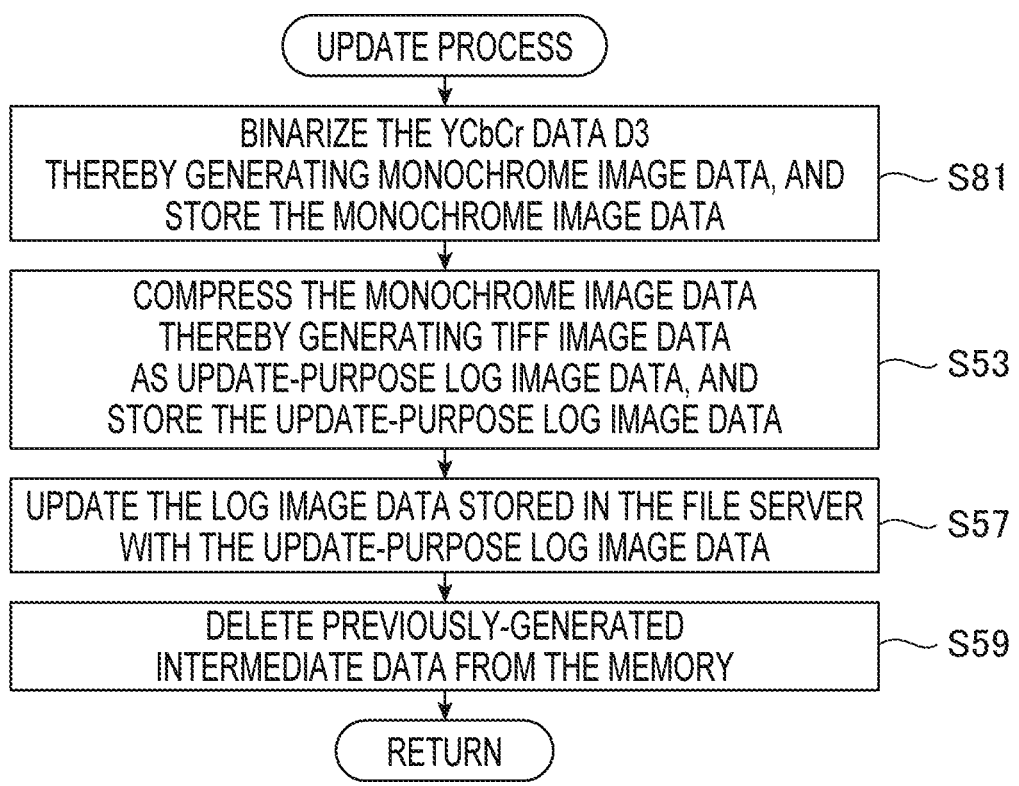

FIG. 8 is a flowchart showing a procedure of an update process to be performed by the MFP, in the second illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

First Illustrative Embodiment

Figure 1:
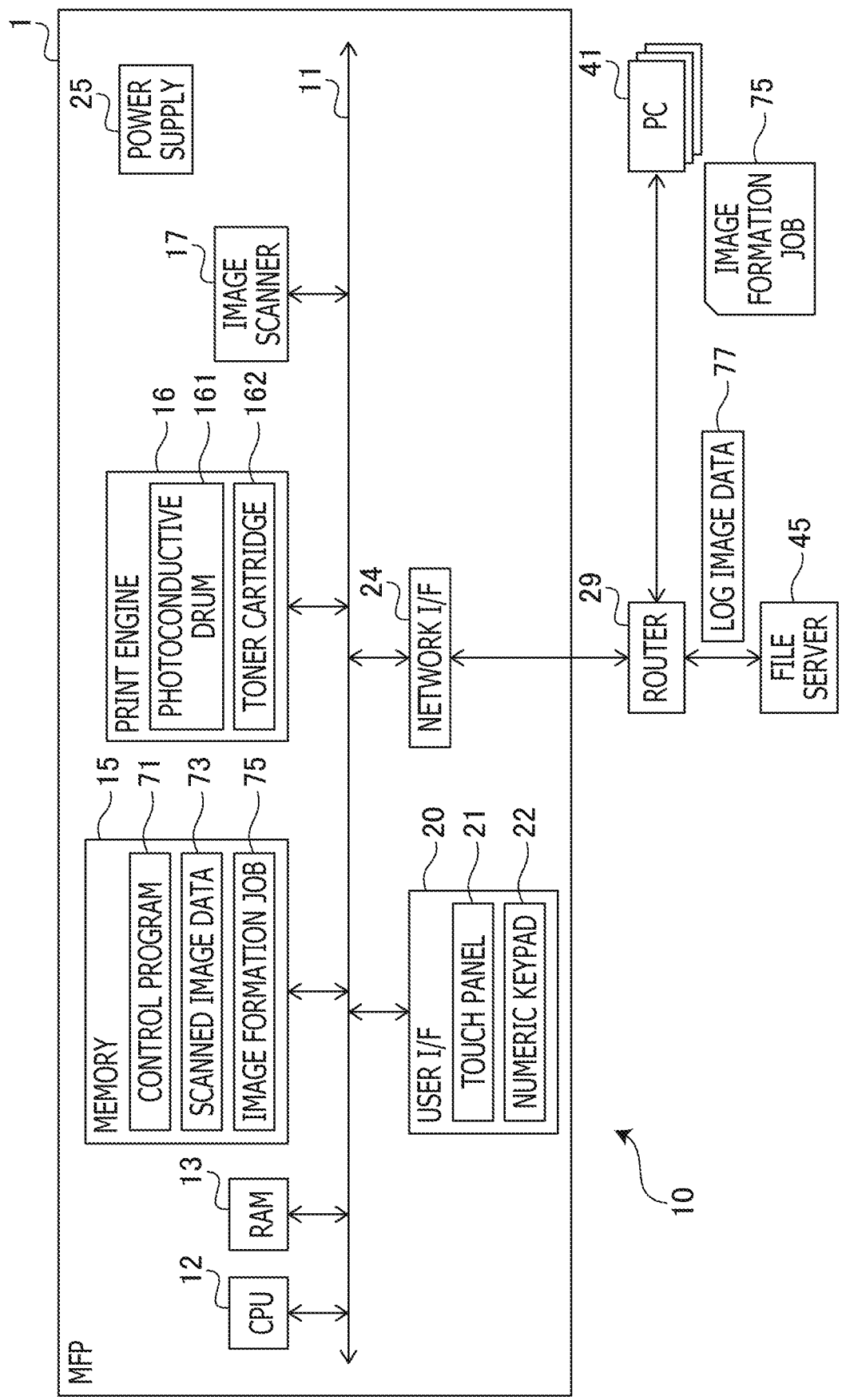
FIG. 1 is a block diagram schematically showing a configuration of an image forming system including an MFP ("MFP" is an abbreviation of "Multi-Function Peripheral"), PCs, and a file server, in a first illustrative embodiment according to one or more aspects of the present disclosure.

Hereinafter, a first illustrative embodiment according to aspects of the present disclosure will be described with reference to FIGS. 1 to 5. FIG. 1 is a block diagram schematically showing a configuration of an image forming system 10 including an MFP ("MFP" is an abbreviation of "Multi-Function Peripheral") 1 of the first illustrative embodiment. As shown in FIG. 1, the image forming system 10 includes the MFP 1, a router 29, a plurality of PCs 41, and a file server 45.

1. Configuration of MFP

The MFP 1 has a plurality of functions such as a printing function, a copy function, and a scanning function. As shown in FIG. 1, the MFP 1 includes a CPU 12, a RAM 13, a memory 15, a print engine 16, an image scanner 17, a user I/F ("I/F" is an abbreviation of "interface") 20, and a network I/F 24. The aforementioned elements included in the MFP 1 are interconnected via a bus 11. It is noted that the print engine 16 may be controlled directly by the CPU 12 or indirectly by the CPU 12 via an engine control circuit (not shown) as an engine interface. Further, the MFP 1 includes a power supply 25 to supply electricity from a commercial power source. The power supply 25 includes a power cord and power supply circuits (e.g., a bridge diode and a smoothing circuit). Specifically, the power supply 25 is configured to generate a DC power from the commercial power source and supply the DC power to each element included in the MFP 1 via a power supply line.

Further, the memory 15 stores various programs such as a control program 71. The control program 71 is configured to comprehensively control the elements included in the MFP 1. The CPU 12 is configured to execute the control program 71 and control the elements interconnected via the bus 11 while temporarily storing processing results into the RAM 13. It is noted that, in the following description, the MFP 1 executing a program such as the control program 71 may be referred to merely as a name of the apparatus. For instance, a description "the MFP 1 receives a user operation to a touch panel 21" may denote "the MFP 1 executes the control program 71 by the CPU 12 and controls the touch panel 21, thereby receiving a user operation to the touch panel 21."

The memory 15, as an example of a storage for the MFP 1, may include a non-volatile memory such as an NVRAM. Further, examples of the storage for the MFP 1 may include, but are not limited to, a RAM, a ROM, an HDD, and an external storage device (e.g., a USB memory) connected with the MFP 1, as well as the aforementioned NVRAM. Further, the examples of the storage for the MFP 1 may include, but are not limited to, a combination of at least two of the aforementioned various storage devices. Further, the examples of the storage for the MFP 1 may include, but are not limited to, a file server 45 connected with the MFP 1 via the network I/F 24. Further, the examples of the storage for the MFP 1 may include, but are not limited to, non-transitory computer-readable storage media. The non-transitory computer-readable storage media are tangible media. The non-transitory computer-readable storage media may include, but are not limited to, ROMs, RAMs, NVRAMs, HDDs, CD-ROMs, and DVD-ROMs. Meanwhile, electrical signals carrying programs downloaded from a server on the Internet may be regarded as computer-readable media, but are not included in the non-transitory computer-readable storage media.

The print engine 16 is configured to form an image on a sheet (e.g., a piece of paper and a transparency) under control by the CPU 12. The print engine 16 includes a photoconductive drum 161 and a toner cartridge 162 to supply toner to the photoconductive drum 161. After a circumferential surface of the photoconductive drum 161 is charged by a charger (not shown) and then exposed to laser light, an electrostatic latent image is formed thereon. The toner cartridge 162 supplies toner to the electrostatic latent image formed on the circumferential surface of the photoconductive drum 161 via a development roller (not shown), thereby forming a toner image on the circumferential surface of the photoconductive drum 161. Then, the toner image on the circumferential surface of the photoconductive drum 161 is transferred onto a sheet, and the transferred toner image is thermally fixed onto the sheet. Thus, the print engine 16 electrophotographically prints the image on the sheet. It is noted that the image forming method of the print engine 16 may not necessarily be limited to the electrophotographic method but may be any other image forming method (e.g., an inkjet method).

The image scanner 17 includes an automatic document feeder (not shown, hereinafter referred to as an "ADF") and an image sensor (not shown) such as a contact image sensor (hereinafter referred to as a "CIS") and a charge-coupled device (hereinafter referred to as a "CCD"). The image scanner 17 is configured to, while continuously feeding a plurality of document sheets set on the ADF, sequentially scan an image of each document sheet by the image sensor under control by the CPU 12, thereby generating scanned image data 73. Specifically, for instance, the image scanner 17 may generate the scanned image data 73 by converting analog data output from the image sensor scanning the plurality of document sheets into digital data via an A/D convertor (not shown). The image scanner 17 stores the generated scanned image data 73 into the memory 15. It is noted that the image scanner 17 may not necessarily have the ADF. For instance, the image scanner 17 may be of an FB ("FB" is an abbreviation of "Flat-Bed") type in which each document sheet is manually placed on a document table on a sheet-by-sheet basis. In this case, the MFP 1 may be configured to consecutively scan the plurality of document sheets in response to a scanned document sheet on the document table being sequentially replaced with a subsequent document sheet.

The user I/F 20 includes the touch panel 21 and operable buttons such as a numeric keypad 22. For instance, the touch panel 21 includes a liquid crystal panel, a light source (e.g., LEDs) for emitting light from a rear side of the liquid crystal panel, and a contact sensing film overlaid on a surface of the liquid crystal panel. The user I/F 20 is configured to display various kinds of information (e.g., various setting screens and an operational status of the MFP 1) on the touch panel 21 under control by the CPU 21. Further, the user I/F 20 is configured to output, to the CPU 12, a signal according to a user operation to the touch panel 21 or the numeral keypad 22. In the first illustrative embodiment, the MFP 1 has the touch panel 21 serving as both a display and an operation I/F.

Nonetheless, the MFP 1 may have hardware keys as an operation I/F separate from a display.

For instance, the network I/F 24 may be a LAN ("LAN" is an abbreviation of "Local Area Network") I/F. The network I/F 24 is connected with a router 29 via a LAN cable (not shown). In the first illustrative embodiment, the router 29 is connected with a plurality of PCs 41 and the file server 45. The user may send an image formation job 75 from a PC 41 to the MFP 1 by operating the PC 41. The MFP 1 performs image scanning and/or printing based on the image formation job 75 received from the PC 41. It is noted that a device to send the image formation job 75 to the MFP 1 is not limited to the PC 41 but may be a mobile terminal wirelessly communicable with the MFP 1. Further, a network via which the MFP 1, the PCs 41, and the file server 45 are interconnected is not limited to the wired LAN but may be a wireless LAN or a WAN (including the Internet). Further, a connection between the MFP 1 and the file server 45 is not limited to the LAN connection but may be a connection complying with USB standards.

Further, the MFP 1 is configured to store log image data 77 into the file server 45. For instance, the log image data 77 may be image data of an image to be checked after a corresponding image has been scanned by the image scanner 17 and printed by the print engine 16 during execution of the copy function. For instance, the log image data 77 may be monochrome image data into which the scanned image data 73 generated by the image scanner 17 is reduced in data size and converted through binarization. It is noted that a data format for the log image data 77 is not limited to a specific data format but may be any type of data format having a smaller data size than the scanned image data 73. For instance, the log image data 77 may be image data partially cut out of the scanned image data 73 or image data having a lower resolution than the scanned image data 73. For instance, a system administrator of the image forming system 10 may check the log image data 77 later, thereby checking what kind of image has been printed by the user.

Further, for instance, the MFP 1 may transmit the log image data 77 to the file server 45 via communication (hereinafter, which may be referred to as "FTP communication") complying with an FTP ("FTP" is an abbreviation of "File Transfer Protocol"). Nonetheless, a method for transmitting the log image data 77 is not limited to the method using the FTP. For instance, the MFP 1 may transmit the log image data 77 to the file server 45 via communication complying with a CIFS ("CIFS" is an abbreviation of "Common Internet File System") protocol or an SMB ("SMB" is an abbreviation of "Server Message Block") protocol.

Further, the MFP 1 may add user information to the log image data 77. For instance, when the MFP 1, having an authentication function, has performed a copy process after completion of an authentication procedure, the MFP 1 may add, to the log image data 77, user information regarding a successfully-authenticated user who is logging in to the MFP 1 and has caused the MFP 1 to perform the copy process. In another instance, when the MFP 1 has performed a printing process or a scanning process in response to receipt of an image formation job 75, the MFP 1 may add, to the log image data 77, user information regarding a user name, set in the image formation job 75, of a user who has caused the MFP 1 to perform the printing process or the scanning process. Thereby, the system administrator may check later which user is associated with the log image data 77, based on the added user information.

2. Scanning Process

Figure 2:
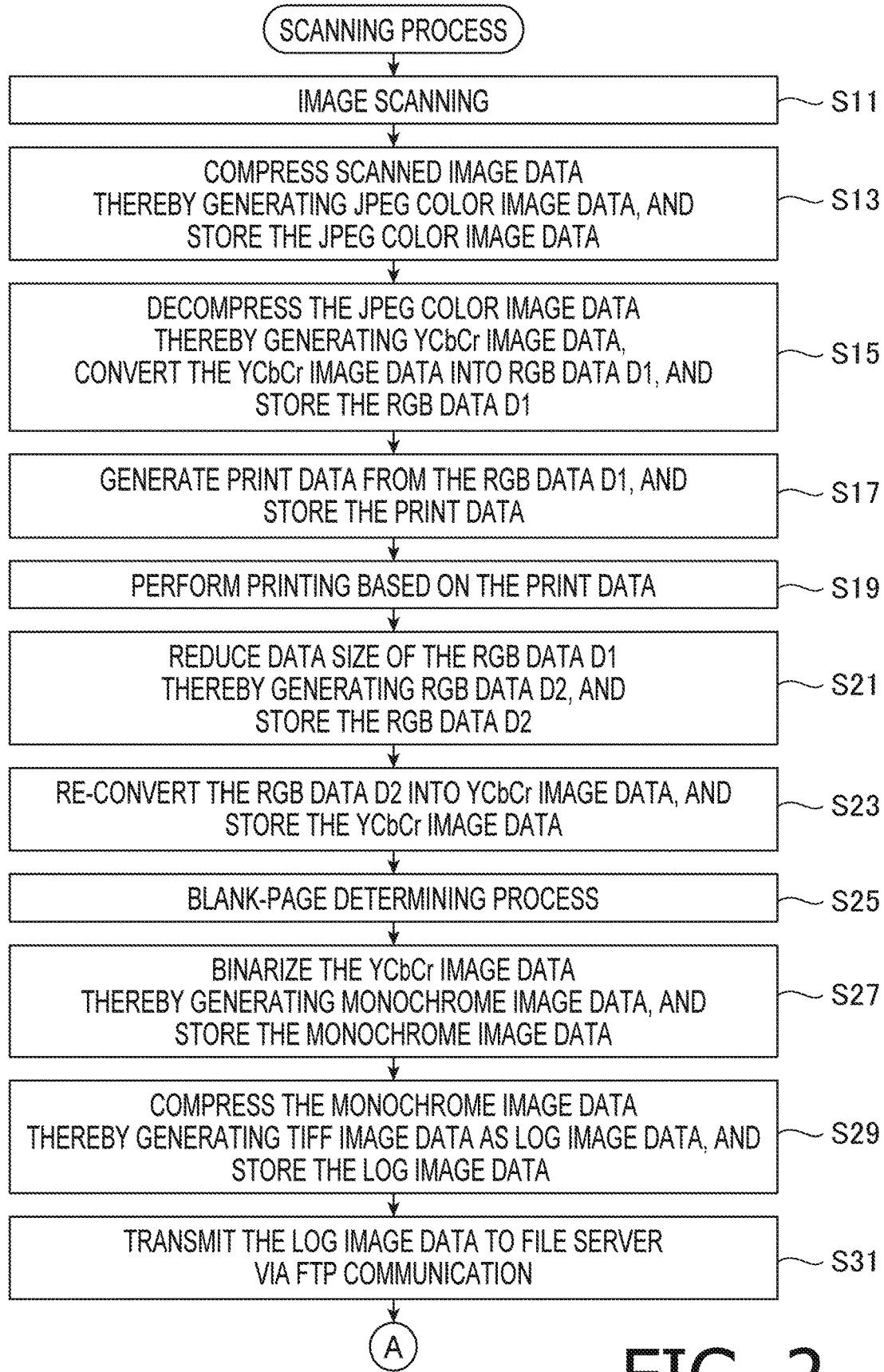
FIGS. 2 and 3 are flowcharts showing a procedure of a scanning process to be performed by the MFP, in the first illustrative embodiment according to one or more aspects of the present disclosure.
Figure 3:
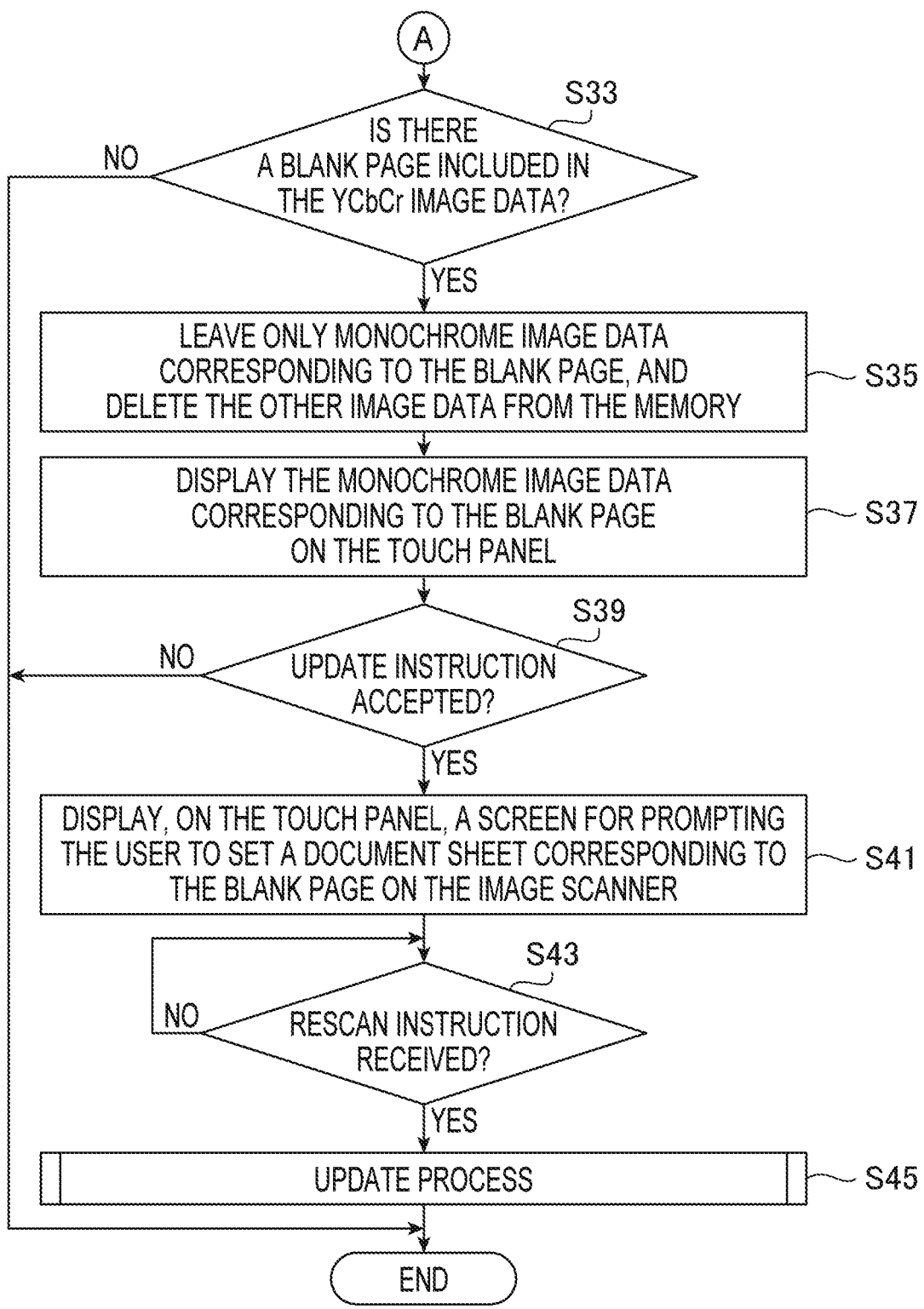

Subsequently, a scanning process by the MFP 1 will be described with reference to FIGS. 2 and 3. FIGS. 2 and 3 are flowcharts showing a procedure of a scanning process by the MFP 1. For instance, in response to being powered on, the MFP 1 executes the control program 71 and activates the image forming system 10. After activating the image forming system 10, the MFP 1 performs the scanning process as shown in FIGS. 2 and 3, for instance, in response to receiving of a user operation to the touch panel 21. For instance, after setting a plurality of document sheets on the ADF of the image scanner 17, the user may operate the touch panel 21 and cause the MFP 1 to perform color copying. Thus, in response to the execution of the copy function, the MFP 1 starts the scanning process as shown in FIGS. 2 and 3. In the scanning process, the MFP 1 transmits log image data 77 of an image canned and color-copied, to the file server 45.

The MFP 1 may be configured to set one of settable options as to whether to save the log image data 77. For instance, the MFP 1 may be configured to set one of the settable options in accordance with a setting operation by the system administrator who has logged in to the MFP 1 from the PC 41 via the network. In another instance, the MFP 1 may be configured to receive a selection of the settable options made by the user via the touch panel 21. Further, a condition for the MFP 1 transmitting the log image data 77 is not limited to the execution of the copy function responsive to the user operation to the touch panel 21. For instance, during execution of the scanning function responsive to a user operation to the touch panel 21, the MFP 1 may store log image data 77 of a scanned image to the file server 45. In another instance, during execution of printing or image scanning based on the image formation job 75 received from the PC 41, the MFP 1 may store log image data 77 of an image printed or scanned, to the file server 45. Further, it is noted that data formats, compression formats, and converting procedures for image data as exemplified in the following description may be changed accordingly.

Flowcharts shown in the present disclosure generally represent processes by the CPU 12 of the MFP 1 in accordance with instructions written in programs (e.g., the control program 71). Namely, in the following description, processes such as "determining," "generating," "receiving," and "receiving" represent processes by the CPU 12 of the MFP 1. The processes by the CPU 12 may include hardware control. Therefore, hereinafter, a "subject" performing a process may be merely referred to as the "CPU 12."

First, the CPU 12 starts image scanning of the document sheets set on the ADF, in response to a user operation to the touch panel 21 (S11). The CPU 12 causes the image sensor (e.g., the CIS) to scan images of the document sheets while driving the ADF to feed the document sheets, thereby generating scanned image data 73 (S13). For instance, the scanned image data 73 may be color image data compressed in a JPEG format. Specifically, in S13, the CPU 12 compresses the scanned image data 73 generated by scanning the image of all the document sheets set on the ADF thereby generating JPEG image data, and stores the JPEG image data into the memory 15.

Subsequently, the CPU 12 reads, out of the memory 15, the scanned image data 73 compressed in the JPEG format, then decompresses the JPEG scanned image data 73 thereby generating YCbCr image data, and converts the YCbCr image data into RGB image data (hereinafter referred to as "RGB data D1") (S15). Further, in S15, the CPU 12 stores the RGB data D1 into the memory 15.

Next, the CPU 12 performs printing of an image represented by the scanned image data 73 (S17 and S19). Specifically, the CPU 12 generates print data from the RGB data D1 generated in S15 (S17). For instance, the print data may be generated by converting the RGB data D1 into CMYK image data and compressing the CMYK image data in a run length compression system. Further, the CPU 12 stores the generated print data into the memory 15 (S17). Then, the CPU 12 reads out the print data stored in the memory 15 and causes the print engine 16 to perform printing based on the print data (S19). Thereby, the CPU 12 causes the image former 17 to perform, on sheet, image formation based on the scanned image data 73 as generated by causing the image scanner 17 to scan the document sheets in S11.

Subsequently, the CPU 12 generates log image data 77 and determines whether there is a blank page. Specifically, the CPU 12 reduces a data size of the RGB data D1 generated in S15 (S21). For instance, the CPU 12 may reduce the number of pixels included in the RGB data D1 to lower a resolution of the RGB data D1, thereby generating RGB data D2 having a lower resolution than the RGB data D1. For instance, the CPU 12 may convert the RGB data D1 with a resolution as high as 600 dpi into the RGB data D2 with a resolution as low as 100 dpi or 200 dpi. Thus, the CPU 12 stores the RGB data D2 having the lowered resolution into the memory 15 (S21). It is noted that a method for reducing the data size of the RGB data D1 is not limited to lowering the resolution of the RGB data D1. For instance, the CPU 12 may reduce the data size of the RGB data D1 by data compression. In another instance, the CPU 12 may reduce the data size of the RGB data D1 by reducing an image size of the RGB data D1. In a further instance, the CPU 12 may reduce the data size of the RGB data D1 by below-mentioned binarization. Alternatively, the CPU 12 may reduce the data size of the RGB data D1 by a combination of at least two of the aforementioned methods.

Next, the CPU 12 re-converts the RGB data D2 having the lowered resolution into YCbCr image data (S23). The CPU 12 stores the YCbCr image data into the memory 15. The CPU 12 performs a blank-page determining process for the YCbCr image data generated in S23 (S25).

As will be described later, the YCbCr image data generated from the RGB data D2 is used for generating the log image data 77 (S27 and S29). Nonetheless, there is a potential risk that the RGB data D2, generated by reducing the data size of the RGB data D1 in S21, might has such low image quality as to cause a blurry image having a reduced number of colored pixels or cause an image having only white pixels. In such a case, the system administrator might be unable to recognize an image represented by the log image data 77 even in an attempt to later check the log image data 77. Further, in an attempt to perform a particular process based on the log image data 77, the system administrator might fail to even detect the image represented by the log image data 77 and therefore be unable to appropriately perform the particular process.

Hence, in the blank-page determining process (S25) of the first illustrative embodiment, the CPU 12 determines whether there is a blank page included in the YCbCr image data. Exemplary methods for determining whether there is a blank page included in the YCbCr image data may include, but are not limited to, generating a histogram of the luminance (Y) of the YCbCr image data and then determining whether there is a blank page included in the YCbCr image data based on a peak of the generated histogram. For example, in this method, the CPU 12 may determine, as a blank page, a page of which pixels having a luminance equal to or more than a predetermined value account for a particular rate or more of the total pixels.

In another instance, the CPU 12 may perform the blank-page determining process, using the RGB data D2 generated in S21. For example, with respect to each individual pixel included in the RGB data D2, the CPU 12 may determine, as a white pixel, a pixel having a luminance equal to or more than a predetermined value page. In this case, the CPU 12 may determine, as a blank page, a page of which the number of pixels determined as white pixels is more than a particular number. In a further instance, the CPU 12 may perform OCR processing to detect recognizable character strings included in each individual page of the RGB data D2 generated in S21 or the YCbCr image data generated in S23, and may determine, as a blank page, a page including no recognizable character string. In a further instance, the CPU 12 may perform the blank-page determining process, using monochrome image data generated by below-mentioned binarization in S27. In this case, the CPU 12 may determine, as a blank page, a page of which the number of white pixels per unit area is equal to or more than a particular number.

After the blank-page determining process (S25), the CPU 12 performs binarization to convert the YCbCr image data generated in S23 into monochrome image data (S27). Thereby, the CPU 12 reduces the data size of the image data. Further, in S27, the CPU 12 stores the generated monochrome image data into the memory 15.

Subsequently, the CPU 12 compresses the monochrome image data generated in S27, for instance, in an MH compression format using Modified Huffman coding, thereby generating TIFF ("TIFF" is an abbreviation of "Tagged Image File Format") image data as the log image data 77 (S29). Further, in S29, the CPU 12 stores the generated log image data 77 into the memory 15. As exemplified above, the CPU 12 generates the print data in S17, performs the printing process in S19, and thereafter generates the log image data in the steps S21 to S29. Nonetheless, the CPU 12 may perform a process required for printing and a process to generate the log image data 77 in parallel. In another instance, the CPU 12 may generate the log image data 77 in advance of performing printing. In a further instance, the CPU 12 may perform the process as executed in the steps S27 to S29 in parallel with the blank-page determining process as executed in S25.

Subsequently, the CPU 12 transmits the log image data 77 to the file server 45 via FTP communication (S31). After completing transmission of the log image data 77, the CPU 12 determines whether there is a blank page included in the YCbCr image data generated in S23, based on the result of the blank-page determining process in S25 (S33 in FIG. 3). When determining that there is no blank page included in the YCbCr image data generated in S23 (S33: No), the CPU 12 terminates the scanning process as shown in FIGS. 2 and 3. Thus, in response to the execution of the copy function, the log image data 77 with no blank page is stored in the file server 45.

Meanwhile, when determining that a blank page is included in the YCbCr image data generated in S23 (S33: Yes), for instance, the CPU 12 leaves, stored in the memory 15, only monochrome image data corresponding to the page determined as a blank page among the monochrome image data as generated and stored in the memory 15 in S27, and deletes the other image data from the memory 15 (S35). The CPU 12 deletes, from the memory 15, intermediate data such as the RGB data D1 generated in the scanning process as shown in FIGS. 2 and 3. Thereby, only the monochrome image data corresponding to the blank page and necessary for a below-mentioned step S37 is left stored in the memory 15, while the other image data is deleted from the memory 15. Thus, it is possible to release a storage area of the memory 15 and prevent shortage of an available capacity of the memory 15.

Further, when terminating the scanning process in response to determining that there is no blank page included in the YCbCr image data generated in S23 (S33: No), the CPU 12 may delete the intermediate data such as the RGB data D1 from the memory 15, thereby releasing a storage area of the memory 15. Further, in the first illustrative embodiment, after transmitting the log image data 77 to the file server 45 (S31), the CPU 12 determines whether there is a blank page included in the YCbCr image data (S33). Nonetheless, before transmitting the log image data 77 to the file server 45, the CPU 12 may determine whether there is a blank page included in the YCbCr image data. For instance, the CPU 12 may determine whether there is a blank page included in the YCbCr image data and may perform a below-mentioned update process to update a blank page, prior to transmitting the log image data 77 to the file server 45. In this case, the CPU 12 may transmit, to the file server 45, log image data 77 reflecting the updated blank page. For instance, when the memory 15 does not have a sufficient storage capacity, as described above, the CPU 12 deletes unnecessary image data from the memory 15 (S35) after once transmitting the log image data 77 (S31), thereby releasing a storage area of the memory 15. Thus, it is possible to prevent shortage of an available capacity of the memory 15. Meanwhile, in another instance, when the memory 15 has a sufficient storage capacity, the CPU 12 may determine whether there is a blank page included in the YCbCr image data and may perform the below-mentioned update process, prior to transmitting the log image data 77. In this case, the CPU 12 may transmit the log image data 77 only once, with no need to repeat the transmission thereof.

Subsequently, the CPU 12 causes the touch panel 21 to display monochrome data corresponding to a page determined as a blank page (S37). FIG. 4 exemplifies a screen image on the touch panel 21 when monochrome data corresponding to a page determined as a blank page is displayed thereon. Specifically, for instance, the CPU 12 displays, on a screen 91, a log image 93 represented by the monochrome data corresponding to the page determined as a blank page. Hereinafter, the page determined as a blank page may be simply referred to as the "blank page." Thus, the user may check details about the blank page by viewing the log image 93. In another instance, in S37, the CPU 12 may display an image represented by image data corresponding to the blank page, among image data (e.g., the log image data 77 in the TIFF format as generated in S29) other than the monochrome image data.

Further, exemplary methods for notifying that the log image data 77 includes a blank page are not limited to the method to display the log image 93 on the touch panel 21. For instance, the CPU 12 may provide a PC 41 with a notification that the log image data 77 includes a blank page. In this case, specifically, when performing a scanning process or a printing process based on the image formation job 75 received from the PC 41 and then determining that the log image data 77 includes a blank page, the CPU 12 may transmit information representing that the log image data 77 includes a blank page, to the PC 41 that has sent the image formation job 75. In another instance, the CPU 12 may transmit the information to a print engine driver being executed by the PC 41, thereby displaying the log image 93 of the blank page on a monitor of the PC 41.

Further, as shown in FIG. 4, the CPU 12 displays, on the screen 91, acceptance buttons 95 (i.e., a "YES" button 95 and a "NO" button 95) for accepting an instruction as to whether to update the log image data 77 including the blank page to higher-quality log image data 77. Based on a user operation to one of the acceptance buttons 95, the CPU 12 determines whether the CPU 12 has accepted an instruction to update the log image data 77 including the blank page via a corresponding one (i.e., the "YES" button 95) of the acceptance buttons 95 (S39). In response to accepting a user operation to the "NO" button 95, the CPU 12 determines that the CPU 12 has accepted an instruction not to update the log image data 77 (S39: No) and terminates the scanning process shown in FIGS. 2 and 3. In this case, the log image data 77 including the page determined as a blank page by the CPU 12 is stored after the user visually checks the log image 93 corresponding to the page determined as a blank page. Thus, even though the log image data 77 includes the page determined as a blank page, when the user visually checks the log image 93 corresponding to the page determined as a blank page and recognizes that the log image 93 is an appropriate image and/or that the log image data 77 does not need to be updated, the log image data 77 may be stored as is without being updated. Consequently, it is possible to avoid unnecessary execution of the update process. In another instance, the CPU 12 may automatically update the log image data 77 including the page determined as a blank page, with no need to ask the user whether to update the log image data 77.

Meanwhile, in response to receiving a user operation to the "YES" button 95, the CPU 12 determines that the CPU 12 has received an instruction to update the log image data 77 (S39: Yes). The CPU 12 causes the touch panel 21 to display a screen 97 instead of the screen 91 as shown in FIG. 4 (S41). For instance, the CPU 12 displays, on the screen 97, a page number of a document sheet determined as a blank page and a message for prompting the user to set the document sheet identified by the page number on the image scanner 17. Thereby, even when the user is unable to recognize the page number of the blank page by merely viewing the log image 93 displayed on the screen 91 since the log image 93 actually represents a blank image, the user is enabled to determine which document sheet is to be set on the image scanner 17. It is noted that, for instance, the CPU 12 may leave, stored in the memory 15, particular image data corresponding to the blank page among the RGB data D1 generated in S13 (see FIG. 2) without deleting the particular image data from the memory 15 in S35. In this case, the CPU 12 may display an image represented by the particular image data on the screen 91, thereby enabling the user to visually check the image corresponding to the blank page. In another instance, the CPU 12 may not display, on the screen 97, the page number of the document sheet determined as a blank page. Specifically, the CPU 12 may display a message for prompting the user to again set the plurality of document sheets on the image scanner 17 in the same order as previously scanned. In this case, the CPU 12 may generate scanned image data 73 of only the document sheet determined as a blank page among the scanned document sheets, and may perform the below-mentioned update process for the generated scanned image data 73.

Further, as shown in FIG. 4, the CPU 12 displays, on the screen 97, a message for prompting the user to touch a rescan button 99 after setting the document sheet identified by the displayed page number on the image scanner 17. The CPU 12 determines whether the CPU 12 has received an instruction to rescan the document sheet identified by the displayed page number, based on whether the rescan button 99 has been touched (S43). The CPU 12 repeatedly makes the determination in S43 until the CPU 12 receives a user operation of touching the rescan button 99 (S43: No). In response to receiving a user operation of touching the rescan button 99 (S43: Yes), the CPU 12 starts the update process shown in FIG. 5 (S45). It is noted that, when determining in S33 that there are a plurality of blank pages included in the YCbCr image data, the CPU 12 may individually receive an instruction as to whether to update a corresponding piece of the log image data 77 for each of the pages determined as blank pages, or may collectively receive instructions as to whether to update respective pieces of the log image data 77 for all the pages determined as blank pages. Further, the CPU 12 may perform the update process (see FIG. 5) individually for each of the pages determined as blank pages or collectively for all the pages determined as blank pages.

3. Update Process

FIG. 5 is a flowchart showing a procedure of the update process. In the following description, explanations of substantially the same operations as executed in the scanning process shown in FIGS. 2 and 3 may be omitted. In response to receiving a user operation of touching the rescan button 99 displayed on the screen 97 (see FIG. 4), the CPU 12 starts the update process (see FIG. 5), in which the CPU 12 performs image scanning (S47). Specifically, in S47, the CPU 12 causes the image scanner 17 to scan an image of a document sheet on the ADF, corresponding to a page to be updated such as the page determined as a blank page, in the same manner as performed in S11 (see FIG. 2). Then, the CPU 12 generates scanned color image data 73 compressed in the JPEG format, and stores the generated scanned color image data 73 into the memory 15 (S49).

Subsequently, the CPU 12 reads the scanned image data 73 out of the memory 15, decompresses the scanned image data 73 thereby generating YCbCr image data, and performs binarization to convert the YCbCr image data into monochrome image data (S51). Further, in S51, the CPU 12 stores the generated monochrome image data into the memory 15. Thus, in the update process, the CPU 12 does not generate any of the RGB data D1 and D2 and the print data as respectively generated in S15, S21, and S17 of the scanning process shown in FIGS. 2 and 3. The CPU 12 generates the monochrome image data by binarizing the scanned color image data of the JPEG format. Thus, the CPU 12 does not make the reduction of the data size of the image data as made in S21 (see FIG. 2). Therefore, it is possible to easily generate update-purpose log image data 77 having higher image quality than the log image data generated in S29 (see FIG. 2). A method for generating the higher-quality update-purpose log image data 77 is not limited to increasing a resolution of the log image data 77. Further, exemplary methods for generating the higher-quality update-purpose log image data 77 may include, but are not limited to, decreasing a compressing rate for the log image data 77, decreasing a reduction rate for reducing the number of gradations available for expressing colors of the log image data 77, adjusting a brightness and/or a contrast of the scanned image in S49 (see FIG. 5), and a combination of at least two of the above-exemplified methods.

Subsequently, the CPU 12 compresses the monochrome image data generated in S51 in the MH compression format, thereby generating TIFF image data as the update-purpose log image data 77 (S53). Thus, the update-purpose log image data 77 is generated as higher-quality image data (i.e., higher-resolution image data) for updating the blank page. In the following description, the update-purpose log image data 77 may be referred to as the "update-purpose log image data 77A" to differentiate it from the log image data 77 generated in S29. Further, in S53, the CPU 12 stores the update-purpose log image data 77A into the memory 15.

Next, the CPU 12 determines whether the log image data 77 transmitted to the file server 45 is multi-page data or single-page data (S55). It is noted that, for instance, the "multi-page data" may be data generated as a single file containing respective pieces of image data of a plurality of document sheets. Further, for instance, the "single-page data" may contain one or more individual files each representing a single piece of image data of a corresponding document sheet. For instance, the CPU 12 may set one of two modes (e.g., a single-page mode and a multi-page mode) available for generating the log image data 77. When the multi-page mode is set, the CPU 12 may generate a single TIFF file containing respective pieces of image data of a plurality of document sheets, as log image data 77 or update-purpose log image data 77A. Further, when the single-page mode is set, the CPU 12 may generate, as log image data 77 or update-purpose log image data 77A, a plurality of TIFF files each of which represents a single piece of image data of a corresponding one of the plurality of document sheets. In another instance, the CPU 12 may be configured to execute only one of the two modes.

In S55, for instance, when the single-page mode is set, the CPU 12 determines that the log image data 77 transmitted to the file server 45 is single-page data (S55: No), and updates the log image data 77 with the update-purpose log image data 77A (S57). Specifically, in S57, the CPU 12 updates the log image data 77 stored in the file server 45 to replace specific log image data corresponding to the blank page among the log image data 77 with the update-purpose log image data 77A. As described above, for instance, when the log image data 77 is single-page data, the log image data 77 may contain a plurality of TIFF files each corresponding to an individual one of the plurality of document sheets. In this case, the CPU 12 updates, with the update-purpose log image data 77A, only a TIFF file corresponding to the blank page among the plurality of TIFF files contained in the log image data 77. For instance, the CPU 12 may transmit, to the file server 45, an update request for updating the log image data 77 with the update-purpose log image data 77A. For instance, the CPU 12 may make a request for updating the log image data 77 by transmitting an FTP command and the update-purpose log image data 77A to the file server 45. In response to receiving the FTP command and the update-purpose log image data 77A, the file server 45 may delete the TIFF file corresponding to the blank page and thereafter replace the deleted file for the blank page with the update-purpose log image data 77A. Thereby, the specific log image data corresponding to the blank page, among the log image data 77 stored in the file server 45, is updated with the update-purpose log image data 77A having higher image quality than the log image data 77. It is noted that a procedure of the update process for the log image data 77 is not limited to the above-exemplified procedure. In another instance, in response to receiving the FTP command, the file server 45 may overwrite the TIFF file corresponding to the blank page with the update-purpose log image data 77A.

After updating the log image data 77 in S57, the CPU 12 deletes intermediate data generated in previous steps from the memory 15, thereby releasing the storage area of the memory 15 (S59). Afterward, the CPU 12 terminates the process shown in FIGS. 2, 3, and 5.

Meanwhile, when the multi-page mode is set, the CPU 12 determines in S55 that the log image data 77 transmitted to the file server 45 is multi-page data (S55: Yes), and downloads the log image data 77 from the file server 45 (S61). When the log image data 77 is multi-page data, the log image data 77 has, as a single TIFF file, a plurality of pieces of image data including image data of the blank page. Hence, it is difficult to update only the target piece of the log image data 77 corresponding to the blank page after transmitting the update-purpose log image data 77A to the file server 45.

For the above reason, after once downloading the log image data 77 in S61, the CPU 12 separates the downloaded log image data 77 on a page-by-page basis and then updates the log image data 77. Specifically, the CPU 12 decompresses the downloaded log image data 77 that is MH-encoded TIFF image data (S63). Thereby, the log image data 77 is converted into the same monochrome image data as before compressed in S29 (see FIG. 2). Further, for instance, in S63, the CPU 12 updates only image data corresponding to the blank page among the monochrome image data generated through the decompression, with monochrome image data generated by decompressing the update-purpose log image data 77A. The CPU 12 compresses, in the MH compression format, the monochrome image data among which only the image data corresponding to the blank page has been updated, thereby generating TIFF image data as updated log image data 77 (S65). The updated log image data 77 contains higher-quality image data as a replacement for the blank page. The CPU 12 transmits an FTP command representing an update request and the updated log image data 77 to the file server 45 (S65). Thus, the log image data 77 as multi-page data is updated. It is noted that, after downloading the log image data 77 in S61, the CPU 12 may delete the log image data 77 stored in the file server 45. In another instance, after transmitting the updated log image data 77 in S65, the CPU 12 may cause the file server 45 to overwrite the log image data 77 stored in the file server 45 with the updated log image data 77. In the first illustrative embodiment, as described above, the CPU 12 decompresses the MH-encoded log image data 77 downloaded from the file server 45 and updates the image data corresponding to the blank page among the decompressed log image data 77, with the decompressed update-purpose log image data 77A. Nonetheless, for instance, the CPU 12 may not decompress the MH-encoded log image data 77 downloaded from the file server 45. In this case, the CPU 12 may update the MH-encoded image data corresponding to the blank page with the MH-encoded update-purpose log image data 77A.

In S65, the CPU 12 transmits the updated log image data 77 to the file server 45. Then, in S59, the CPU 12 deletes the intermediate data from the memory 15. Afterward, the CPU 12 terminates the process shown in FIGS. 2, 3, and 5. Thus, the CPU 12 updates the image data corresponding to the page determined as a blank page among the log image data 77.

4. Advantageous Effects

The aforementioned first illustrative embodiment provides the following advantageous effects. The MFP 1 includes the image scanner 17, the print engine 16, and the CPU 12. The CPU 12 causes the image scanner 17 to scan images of document sheets, thereby generating scanned image data 73 compressed in the JPEG format (S13). The CPU 12 generates print data based on the scanned image data 73 (S17). The CPU 12 causes the print engine 16 to form image on sheet in accordance with the print data (S19). The CPU 12 generates log image data 77 by reducing a data size of RGB data D1 generated from the scanned image data 73 (S21, S23, S27, and S29). The CPU 12 determines whether the log image data 77 (more specifically, the YCbCr image data from which the log image data 77 has been generated) includes a blank page (S33). When determining that the log image data 77 includes a blank page (S33: Yes), the CPU 12 generates update-purpose log image data 77A having higher image quality than the log image data 77 (S47, S49, S51, and S53).

Thus, the CPU 12 generates the update-purpose log image data 77A having higher image quality in response to determining that the log image data 77 includes a blank page. Thereby, even though the reduction of the data size of the RGB data D1 causes a blank page included in the log image data 77, it is possible to use the update-purpose log image data 77A as more appropriate image data of higher image quality than image data corresponding to the blank page among the log image data 77. For instance, the update-purpose log image data 77A may enable the user to more correctly recognize an image of the page determined as a blank page.

Further, the CPU 12 performs the update process to update the log image data 77 with the update-purpose log image data 77A (S57, S61, S63, and S65). Thus, when determining that the log image data 77 includes a blank page, the CPU 12 updates the log image data 77 with the update-purpose log image data 77A. Hence, even when the log image data 77 includes a blank page, it is possible to use the log image data 77 as more appropriate image data updated with the update-purpose log image data 77A having higher image quality.

Further, the MFP 1 includes the network I/F 24. The CPU 12 transmits the log image data 77 to the file server 45 via the network I/F 24 (S31). When determining that the log image data 77 (more specifically, the YCbCr image data from which the log image data 77 has been generated) includes a blank page (S33: Yes), the CPU 12 transmits to the file server 45 an update request for updating the log image data 77 with the update-purpose log image data 77A (S57 and S65).

Accordingly, since the log image data 77 is stored in the file server 45, there is no need to store the log image data 77 in the MFP 1. Thereby, it is possible to reduce a storage capacity required as a function of the MFP 1. Further, the CPU 12 may transmit the update request to the file server 45 in response to detecting the blank page, thereby saving the updated log image data 77 as more appropriate image data than the log image data 77 before updated.

Further, when determining that the log image data 77 (more specifically, the YCbCr image data from which the log image data 77 has been generated) includes a blank page (S33: Yes), the CPU 12 notifies that the log image data 77 includes a blank page (S37). When determining that the CPU 12 has received an instruction to update the log image data 77 (S39: Yes), the CPU 12 performs the update process. Thus, the CPU 12 does not automatically perform the update process in response to detecting the blank page but waits for and receives an instruction to update the log image data 77 from the user. Hence, the user may determine whether there is a need to perform the update process and then make a selection as to whether to perform the update process.

When determining that the CPU 12 has received an instruction to update the log image data 77 (S39: Yes), the CPU 12 causes the image scanner 17 to scan a document sheet corresponding to the page determined as a blank page, thereby generating rescanned image data (S47 and S49). Further, the CPU 12 generates update-purpose log image data 77A from the rescanned image data (S51 and S53).

Thus, when determining that the CPU 12 has received an instruction to update the log image data 77, the CPU 12 causes the image scanner 17 to rescan the document sheet corresponding to the page determined as a blank page. The CPU 12 updates the image data corresponding to the blank page among the log image data 77, using the rescanned image data generated by rescanning the document sheet corresponding to the blank page. The CPU 12 does not need to hold the scanned image data 73 in the memory 15 until starting updating the log image data 77, and may generate the rescanned image data in response to the instruction to update the log image data 77. Hence, it is possible to prevent an available storage area of the memory 15 from being reduced by keeping holding the scanned image data 73.

Second Illustrative Embodiment

Subsequently, a second illustrative embodiment according to aspects of the present disclosure will be described with reference to FIGS. 6 to 8. In the following description, substantially the same elements as exemplified in the aforementioned first illustrative embodiment may be provided with the same reference characters as used in the first illustrative embodiment, and explanations of the same elements may be omitted.

5. Scanning Process in Second Illustrative Embodiment

First, the CPU 12 of the MFP 1 starts image scanning of a plurality of document sheets (S11), and generates scanned color image data 73 compressed in the JPEG format (S13). The CPU 12 generates RGB data D1 from YCbCr image data generated by decompressing the scanned image data 73 (S15). The CPU 12 generates print data from the RGB data D1 (S17), and performs printing based on the print data (S19).

Subsequently, the CPU 12 decompresses the JPEG scanned image data 73 that has been stored into the memory 15 in S13, thereby generating YCbCr image data (hereinafter referred to as "YCbCr data D3") (S71). Further, in S71, the CPU 12 reduces a data size of the YCbCr data D3. Specifically, for instance, the CPU 12 may reduce a resolution of the YCbCr data D3, thereby generating YCbCr data D4 having a lower resolution than the YCbCr data D3. Further, in S71, The CPU 12 stores the generated YCbCr data D4 into the memory 15. Then, the CPU 12 performs a blank-page determining process for the YCbCr data D4 generated in S71 (S73).

In the aforementioned first illustrative embodiment, in S21 (see FIG. 2), the CPU 12 reduces the data size of the RGB data D1 that is intermediate data for generating the print data. Then, in S23, the CPU 12 generates the RGB data D2 having a lower resolution than the RGB data D1, and converts the RGB data D2 into the YCbCr image data. Further, in S25, the CPU 12 performs the blank-page determining process for the YCbCr image data.

In contrast, in the second illustrative embodiment, from the YCbCr data D3 generated by decompressing the scanned image data 73, the CPU 12 generates the YCbCr data D4 having a lower resolution than the YCbCr data D3. Then, the CPU 12 performs the blank-page determining process, using the YCbCr data D4. Thus, the CPU 12 may lower the resolution of the image data (i.e., the YCbCr data D3) in the YCbCr format, thereby reducing the data size of the image data. Further, the CPU 12 may start S71 prior to generating the RGB data D1. Hence, the CPU 12 may perform a process of S15 to S19 in parallel with another process of S71 and the following steps, thereby shortening a period of time required for performing the two processes.

Subsequently, after S73, the CPU 12 converts the YCbCr data D4 generated in S71 into monochrome image data (S75). The CPU 12 compresses the monochrome image data generated in S73 in the MH compression format, thereby generating TIFF log image data 77 (S29). The CPU 12 transmits the log image data 77 to the file server 45 (S31). The CPU 12 determines whether there is a blank page included in the YCbCr data D4, based on the result of the blank-page determining process performed in S73 (S77).

As shown in FIG. 7, when determining that there is a blank page included in the YCbCr data D4 (S77: Yes), the CPU 12 leaves, stored in the memory 15, monochrome image data corresponding to the blank page among the monochrome image data generated in S75 and the YCbCr data D3, and deletes the other image data from the memory 15 (S79).

In the aforementioned first illustrative embodiment, in S35 (see FIG. 3), the CPU 12 leaves only the monochrome image data corresponding to the blank page and deletes the other image data from the memory 15. In contrast, in the second illustrative embodiment, in addition to the monochrome image data corresponding to the blank page, the YCbCr data D3, as original image data from which the YCbCr data D4 has been generated in S71 to have a lower data size, is as well left stored in the memory 15. Thereby, the CPU 12 may generate update-purpose log image data 77A from the YCbCr data D3 still stored in the memory 15, in a below-mentioned update process as shown in FIG. 8. Thus, in the second illustrative embodiment, it is possible to omit rescanning of a document sheet corresponding to a page to be updated such as the page determined as a blank page.

After S79, the CPU 12 causes the touch panel 21 to display monochrome image data corresponding to YCbCr data D4 of the page determined as a blank page (S37). In response to receiving a user operation to the "YES" button 95 on the screen 91 (S39: Yes), the CPU 12 performs the update process (S45). As described above, in the second illustrative embodiment, since the YCbCr data D3 is left in the memory 15, there is no need to rescan a document sheet corresponding to a page to be updated such as the page determined as a blank page. In other words, there is no need to execute S41 or S43 (see FIG. 3).

6. Update Process in Second Illustrative Embodiment

FIG. 8 is a flowchart showing a procedure of the update process in the second illustrative embodiment. As shown in FIG. 8, in the second illustrative embodiment, since the YCbCr data D3 is left stored in the memory 15, there is no need for execution of S47 or S49 (see FIG. 5) as exemplified in the aforementioned first illustrative embodiment. After starting the update process, the CPU 12 generates monochrome image data from the YCbCr data D3 stored in the memory 15 (S81). Then, from the monochrome image data, the CPU 12 generates the update-purpose log image data 77A having higher image quality than the log image data 77 (S53). Accordingly, unlike the scanning process shown in FIGS. 6 and 7, the CPU 12 generates the monochrome image data directly from the YCbCr data D3 without generating the lower-resolution YCbCr data D4, in the update process shown in FIG. 8. Thus, it is possible to easily generate the higher-quality update-purpose log image data 77A without performing a process such as S71 to reduce the data size of the YCbCr data D3. It is noted that data to be left in the memory 15 for the update process is not limited to the YCbCr data D3. For instance, the CPU 12 may leave stored in the memory 15 the JPEG scanned image data 73 generated in S13, and may use the JPEG scanned image data 73 for the update process.

The CPU 12 updates the log image data 77 stored in the file server 45, using the update-purpose log image data 77A (S57). The CPU 12 deletes intermediate data generated in previous steps from the memory 15 (S59). The CPU 12 terminates the process shown in FIGS. 6, 7, and 8. It is noted that, in the update process of the second illustrative embodiment as well, the CPU 12 may update the log image data 77 in an appropriate method depending on whether the log image data 77 is multi-page data or single-page data, in the same manner as exemplified in the aforementioned first illustrative embodiment.

7. Advantageous Effects of Second Illustrative Embodiment

As described above, the second illustrative embodiment may provide substantially the same effects as the aforementioned first illustrative embodiment. Further, in the second illustrative embodiment, when determining that the CPU 12 has received an instruction to update the log image data 77 (S39: Yes), the CPU 12 generates the update-purpose log image data 77A from image data (e.g., the YCbCr data D3 left in the memory 15) associated with the scanned image data 73 (S81).

Accordingly, the CPU 12 may leave, stored in the memory 15, the scanned image data 73 (i.e., the image data compressed in the JPEG format) generated in S13 and/or the YCbCr data D3 generated from the scanned image data 73. Further, the CPU 12 may generate the update-purpose log image data 77A by using the image data (e.g., the YCbCr data D3) left for the update process. Thereby, there is no need for the CPU 12 to cause the image scanner 17 to rescan a document sheet corresponding to the page determined as a blank page in the update process.

Further, in the second illustrative embodiment, when determining that the CPU 12 has received the instruction to update the log image data 77 (S39: Yes), the CPU 12 generates the update-purpose log image data 77A without reducing the data size of the YCbCr data D3 associated with the scanned image data 73 (S81). Namely, the CPU 12 generates the update-purpose log image data 77A without performing a process such as S71 to reduce the data size of the YCbCr data D3. Thus, in the second illustrative embodiment, it is possible to generate the higher-quality update-purpose log image data 77A in a more simplified procedure than the procedure (including S71) to generate the log image data 77.

Hereinabove, the illustrative embodiments according to aspects of the present disclosure have been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that aspects of the present disclosure are capable of use in various other combinations and environments and is capable of changes or modifications within the scope of the inventive concept as expressed herein. For instance, the following modifications according to aspects of the present disclosure are feasible.

8. Modifications

The CPU 12 may have only to generate and save the update-purpose log image data 77A, without updating the log image data 77 with the update-purpose log image data 77A. For instance, the CPU 12 may store the update-purpose log image data 77A in a particular storage area of the memory 15. Thereby, when it is determined that the log image data 77 includes a blank page, the user may check the update-purpose log image data 77A stored in the particular storage area of the memory 15. It is noted that a storage destination for the log image data 77 is not limited to a specific storage location. For instance, the CPU 12 may store the log image data 77 into the MFP 1. In this case, the CPU 12 may update the log image data 77 stored in the MFP 1 in response to detecting a blank page included in the log image data 77. In another instance, the CPU 12 may store the log image data 77 into a PC 41 connected via the LAN or into an external device connected via a USB cable. In a further instance, the CPU 12 may transmit the log image data 77 to a mobile terminal connectable via wireless communication.

Further, the CPU 12 may not necessarily perform a process (e.g., S37) to notify that the log image data 77 includes a blank page. In this case, the CPU 12 may automatically store the update-purpose log image data 77A and update the log image data 77 without receiving a user instruction. Further, a storage destination for the control program 71 is not limited to the memory 15 but may be a computer-readable storage medium such as a RAM, an HDD, a CD-ROM, and a DVD-ROM. Further, in the aforementioned illustrative embodiments, the CPU 12 is used as a "controller" according to aspects of the present disclosure. Nonetheless, examples of the "controller" may include but are not limited to a specific hardware element such as an ASIC ("ASIC" is an abbreviation of "Application Specific Integrated Circuit"). Further, functions of the "controller" may be achieved in cooperation between processes according to software and processes by hardware elements. Further, in the aforementioned illustrative embodiments, the MFP 1 is used as an "image processing apparatus" according to aspects of the present disclosure. Nonetheless, examples of the "image processing apparatus" may include but are not limited to an apparatus or a device having only the scanning function and the printing function. Further, the "image processing apparatus" may have a facsimile transmission function and an e-mail transmission function, as well as the scanning function and the printing function. For instance, the "image processing apparatus" may store, into the file server 45, log image data 77 associated with an image sent by the facsimile transmission function or an image attached to an e-mail sent by the e-mail transmission function. In this case, a processor to perform sending the image via facsimile transmission or attaching the image to the e-mail may be an example of the "image processing apparatus."

Examples of associations between elements set forth in the aforementioned illustrative embodiments and elements according to aspects of the present disclosure will be shown below. The MFP 1 may be an example of an "image processing apparatus" according to aspects of the present disclosure. The image scanner 17 may be an example of a "scanner" according to aspects of the present disclosure. The print engine 16 may be an example of a "print engine" according to aspects of the present disclosure. The CPU 12 may be an example of a "controller" according to aspects of the present disclosure. Further, the memory 15 may be included in the "controller" according to aspects of the present disclosure. The network I/F 24 may be an example of a "communication interface" according to aspects of the present disclosure. The file server 45 may be an example of an "external device" according to aspects of the present disclosure. The log image data 77 may be an example of "first log image data" according to aspects of the present disclosure. The update-purpose log image data 77A may be an example of "second log image data" according to aspects of the present disclosure.

What is claimed is:

1. An image processing apparatus comprising:
    a scanner;
    a print engine; and
    a controller configured to:
        control the scanner to scan images of one or more document sheets, thereby generating scanned image data;
        generate print data based on the scanned image data;
        control the print engine to print, on sheets, the images based on the print data;
        generate first log image data through reducing a data size of image data associated with the scanned image data;
        determine whether the first log image data includes a particular type of page; and
        when determining that the first log image data includes the particular type of page, generate second log image data having higher image quality than image quality of the first log image data.

2. The image processing apparatus according to claim 1, wherein the controller is further configured to update the first log image data with the second log image data.

3. The image processing apparatus according to claim 2, wherein the controller is further configured to update the first log image data by replacing, with the second log image data, log image data corresponding to the particular type of page among the first log image data.

4. The image processing apparatus according to claim 2, further comprising a communication interface,
    wherein the controller is further configured to:
        transmit the first log image data to an external device via the communication interface; and
        when determining that the first log image data includes the particular type of page, transmit, to the external device via the communication interface, an update request for updating the first log image data with the second log image data.

5. The image processing apparatus according to claim 2, wherein the controller is further configured to, when determining that the first log image data includes the particular type of page, perform:
    providing a notification that the log image data includes the particular type of page; and
    in response to receiving an instruction to update the first log image data, updating the first log image data with the second log image data.

6. The image processing apparatus according to claim 5, wherein the controller is further configured to, in response to receiving the instruction to update the first log image data, perform:
    controlling the scanner to scan the image of a document sheet corresponding to the particular type of page, thereby generating rescanned image data; and
    generating the second log image data from the rescanned image data.

7. The image processing apparatus according to claim 5, wherein the controller is further configured to, in response to receiving the instruction to update the first log image data, generate the second log image data from the image data associated with the scanned image data.

8. The image processing apparatus according to claim 7, wherein the controller is further configured to, in response to receiving the instruction to update the first log image data, generate the second log image data from the image data associated with the scanned image data, without reducing the data size of the image data associated with the scanned image data.

9. The image processing apparatus according to claim 8, wherein the controller is further configured to, in response to receiving the instruction to update the first log image data, generate the second log image data from the image data associated with the scanned image data, without reducing a resolution of the image data associated with the scanned image data.

10. The image processing apparatus according to claim 1, wherein the particular type of page is a blank page.

11. The image processing apparatus according to claim 1, wherein the controller comprises:
    a processor; and
    a memory storing computer-readable instructions configured to, when executed by the processor, cause the controller to:
        control the scanner to scan the images of the one or more document sheets, thereby generating the scanned image data;
        generate the print data based on the scanned image data;
        control the print engine to print, on sheets, the images based on the print data;
        generate the first log image data through reducing the data size of the image data associated with the scanned image data;
        determine whether the first log image data includes the particular type of page; and
        when determining that the first log image data includes the particular type of page, generate the second log image data having higher image quality than the first log image data.

12. A method implementable on a processor coupled with an image processing apparatus comprising a scanner and a print engine, the method comprising:

controlling the scanner to scan images of one or more document sheets, thereby generating scanned image data;
generating print data based on the scanned image data;
controlling the print engine to print, on sheets, the images based on the print data;
generating first log image data through reducing a data size of image data associated with the scanned image data;
determining whether the first log image data includes a particular type of page; and
when determining that the first log image data includes the particular type of page, generating second log image data having higher image quality than image quality of the first log image data.

13. The method according to claim 12, further comprising:
updating the first log image data with the second log image data.

14. The method according to claim 13, further comprising:
updating the first log image data by replacing, with the second log image data, log image data corresponding to the particular type of page among the first log image data.

15. The method according to claim 13, further comprising:
transmitting the first log image data to an external device via a communication interface of the image processing apparatus; and
when determining that the first log image data includes the particular type of page, transmitting, to the external device via the communication interface, an update request for updating the first log image data with the second log image data.

16. A non-transitory computer-readable medium storing computer-readable instructions that are executable by a processor coupled with an image processing apparatus comprising a scanner and a print engine, the instructions being configured to, when executed by the processor, cause the image processing apparatus to:
control the scanner to scan images of one or more document sheets, thereby generating scanned image data;
generate print data based on the scanned image data;
control the print engine to print, on sheets, the images based on the print data;
generate first log image data through reducing a data size of image data associated with the scanned image data;
determine whether the first log image data includes a particular type of page; and
when determining that the first log image data includes the particular type of page, generate second log image data having higher image quality than image quality of the first log image data.

17. The non-transitory computer-readable medium according to claim 16,
wherein the instructions are further configured to, when executed by the processor, cause the image processing apparatus to update the first log image data with the second log image data.

18. The non-transitory computer-readable medium according to claim 17,
wherein the instructions are further configured to, when executed by the processor, cause the image processing apparatus to update the first log image data by replacing, with the second log image data, log image data corresponding to the particular type of page among the first log image data.

19. The non-transitory computer-readable medium according to claim 17,
wherein the instructions are further configured to, when executed by the processor, cause the image processing apparatus to:
transmit the first log image data to an external device via a communication interface of the image processing apparatus; and
when determining that the first log image data includes the particular type of page, transmit, to the external device via the communication interface, an update request for updating the first log image data with the second log image data.

20. The non-transitory computer-readable medium according to claim 17,
wherein the instructions are further configured to, when executed by the processor, cause the image processing apparatus to, when determining that the first log image data includes the particular type of page, perform:
providing a notification that the log image data includes the particular type of page; and
in response to receiving an instruction to update the first log image data, updating the first log image data with the second log image data.

* * * * *